United States Patent
Fukusako et al.

(10) Patent No.: US 7,188,468 B2
(45) Date of Patent: Mar. 13, 2007

(54) CONTROLLER FOR CYLINDER CUT-OFF FOR MULTI-CYLINDER INTERNAL COMBUSTION ENGINE

(75) Inventors: Takaaki Fukusako, Wako (JP); Haruhiko Yamada, Wako (JP); Tatsuro Isono, Wako (JP); Masato Amano, Wako (JP); Toshiaki Ichoda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 128 days.

(21) Appl. No.: 10/871,906

(22) Filed: Jun. 17, 2004

(65) Prior Publication Data

US 2005/0022509 A1 Feb. 3, 2005

(30) Foreign Application Priority Data

Jun. 17, 2003 (JP) ............................. 2003-172691

(51) Int. Cl.
*F01N 3/00* (2006.01)
(52) U.S. Cl. ..................... 60/285; 60/277; 60/284; 123/198 F; 123/481
(58) Field of Classification Search ............... 60/274, 60/284, 285, 286, 277; 123/198 F, 481, 123/691, 692
See application file for complete search history.

(56) References Cited

U.S. PATENT DOCUMENTS 4,134,261 A * 1/1979 Iizuka et al. ............... 60/276
6,023,929 A * 2/2000 Ma ............................. 60/295
6,408,618 B2 6/2002 Ide
6,415,601 B1 * 7/2002 Glugla et al. ............... 60/284
6,553,756 B1 * 4/2003 Sealy et al. ................. 60/285
6,739,123 B2 * 5/2004 Glugla et al. ............... 60/284
6,829,886 B2 * 12/2004 Nakata ....................... 60/277
6,857,264 B2 * 2/2005 Ament ....................... 60/284
6,922,986 B2 * 8/2005 Rozario ..................... 60/284
6,931,839 B2 * 8/2005 Foster ....................... 60/284
6,938,410 B2 * 9/2005 Glugla et al. ............... 60/284
2003/0221419 A1 * 12/2003 Surnilla ..................... 60/285

FOREIGN PATENT DOCUMENTS

JP 2001-227369 8/2001

* cited by examiner

*Primary Examiner*—Tu M. Nguyen
(74) *Attorney, Agent, or Firm*—Lahive & Cockfield LLP; Anthony A. Laurentano, Esq.

(57) ABSTRACT

A controller for cylinder cut-off for a multi-cylinder internal combustion engine including a partially operable cylinder that can be cutoff by a cut-off cylinder mechanism provided therewith and a full operating cylinder that is not cut off, the controller for cylinder cut-off including a partially operable cylinder side catalyst temperature estimating section, a full operating cylinder side catalyst temperature estimating section, and a cylinder cut-off authorization determining section for determining whether to authorize or prohibit a cut-off of the partially operable cylinder based on a partially operable cylinder side catalyst temperature estimated by the partially operable cylinder side catalyst temperature estimating section: and a full operating cylinder side catalyst temperature estimated by the full operating cylinder side catalyst temperature estimating section.

7 Claims, 7 Drawing Sheets

CONTROLLER FOR CYLINDER CUT-OFF FOR MULTI-CYLINDER INTERNAL COMBUSTION ENGINE

BACKGROUND OF THE INVENTION

The present invention relates to a controller for cylinder cut-off for a multi-cylinder internal combustion engine which includes a partially operable cylinder that can be cut-off by a cut-off cylinder mechanism provided therewith and a full operating cylinder that is not cut off.

In controller for cylinder cut-off for attempting to decrease the fuel consumption by cutting off a cylinder of a multi-cylinder internal combustion engine of this type when the load of the engine is low, there is proposed such a controller for cylinder cut-off which controls such that the cut-off of the cylinder is prohibited when a temperature of a partially operable cylinder side catalyst provided along an exhaust passageway connecting to a partially operable cylinder is estimated, the partially operable cylinder side catalyst temperature so estimated becoming lower than a predetermined temperature of the catalyst (for example, refer to a patent literature No. 1).

[Patent Literature No. 1]
JP-A-2001-227369

In the event that the temperature of a catalyst provided on a partially operable cylinder side becomes lower than the activation temperature thereof due to the cut-off of the partially operable cylinder, since exhaust gas is not purified effectively until the catalyst is heated to the activation temperature thereof after the cylinder cut-off is released and hence exhaust emissions get worse, in the aforesaid patent literature No. 1, when the estimated catalyst temperature lowers below the predetermined temperature, the cut-off of the cylinder is prohibited, whereby the cylinder is reactivated, so that the catalyst is maintained activated at all times.

On the other hand, the full operating cylinder which is arranged to operate at all times while the partially operable cylinder is being cut-off takes over the output that would otherwise be borne by the partially operable cylinder, the temperature of the full operating cylinder side catalyst is increased by the heat of exhaust gas.

The catalyst itself has a heat-resistant critical temperature, and since there is a risk that the catalyst is damaged in case the catalyst is heated to exceed this critical temperature, the cut-off of the partially operable cylinder is released before then so as to allow all the cylinders to operate, whereby the load of the full operating cylinder is reduced, thereby making it possible to reduce the temperature of the full operating cylinder side catalyst.

As is described in the patent literature No. 1, in the event that the cut-off of the cylinder is controlled to be prohibited when the partially operable cylinder side catalyst temperature becomes lower than the predetermined value by monitoring only the partially operable cylinder side catalyst, there may occur a case where the temperature of the full operating cylinder side catalyst exceeds the heat-resistant critical temperature before the temperature of the partially operable cylinder side catalyst becomes lower than the predetermined temperature, resulting in a risk that the full operating cylinder side catalyst is damaged.

SUMMARY OF THE INVENTION

The invention is made in view of the situations, and an object thereof is to provide a controller for cylinder cut-off for a multi-cylinder internal combustion chamber which can maintain the temperature of a partially operable cylinder side catalyst at the activation temperature of the catalyst and which can protect a full operating cylinder side catalyst against heat.

With a view to attaining the above object, according to a first aspect of the invention, there is provided a controller for cylinder cut-off for a multi-cylinder internal combustion engine including a partially operable cylinder that can be cut off by a cut-off cylinder mechanism provided therewith and a full operating cylinder that is not cut off for determining an authorization to cut off a cylinder based on a temperature of a catalyst on a partially operable cylinder side and a temperature of a catalyst on a full operating cylinder side, the controller for cylinder cut-off including a partially operable cylinder side catalyst temperature estimating section provided along an exhaust passageway connecting to a partially operable cylinder for estimating a temperature of a catalyst on a partially operable cylinder side, a full operating cylinder side catalyst temperature estimating section provided along an exhaust passageway connecting to a full operating cylinder for estimating a temperature of a catalyst on a full operating cylinder side, and a cylinder cut-off authorization determining section for determining whether to authorize or prohibit a cut-off of the partially operable cylinder based on a partially operable cylinder side catalyst temperature estimated by the partially operable cylinder side catalyst temperature estimating section and a full operating cylinder side catalyst temperature estimated by the full operating cylinder side catalyst temperature estimating section.

Since the partially operable cylinder side catalyst temperature and the full operating cylinder side catalyst temperature are estimated so that whether to authorize or prohibit the cut-off of the cylinder is determined based on both the catalyst temperatures so estimated, when the cut-off of the cylinder is released with the partially operable cylinder side temperature being maintained to the activation temperature thereof, the purifying capability of the catalyst can be maintained, and the temperature of the full operating cylinder side catalyst can be prevented from exceeding the heat-resistant critical temperature thereof, whereby the catalyst can be protected.

According to a second aspect of the invention, there is provided a controller for cylinder cut-off for a multi-cylinder internal combustion engine as set forth in the first aspect of the invention, wherein the cylinder cut-off authorization determining section determines the prohibition of cut-off of the partially operable cylinder either at a point in time where the partially operable cylinder side catalyst temperature becomes equal to or lower than a predetermined lower limit temperature or a point in time where the full operating cylinder side catalyst temperature becomes equal to or higher than a predetermined upper limit temperature, which comes earlier.

By determining the prohibition of cut-off of the cylinder either at the point in time where the partially operable cylinder side catalyst temperature becomes equal to or lower than a predetermined lower limit temperature or the point in time where the full operating cylinder side catalyst temperature becomes equal to or higher than a predetermined upper limit temperature, which comes earlier, the partially operable cylinder side catalyst can be maintained at the activation temperature thereof, and the full operating cylinder side catalyst can be protected against heat.

According to a third aspect of the invention, there is provided a controller for cylinder cut-off: for a multi-cylinder internal combustion engine as set forth in the second aspect of the invention, wherein the lower limit temperature and the upper limit temperature each have a predetermined range of hysteresis.

By providing a predetermined range of hysteresis both for the lower limit temperature and the upper limit temperature, an easy determination of whether to authorize or prohibit the cut-off of the cylinder can be prevented from being repeated, thereby making it possible to implement a highly reliable cut-off cylinder control.

According the a fourth aspect of the invention, there is provided a controller for cylinder cut-off for a multi-cylinder internal combustion engine as set forth in any of the first to third aspect of the invention, further including a partially operable cylinder side seal mat temperature estimating section for estimating a temperature of a seal mat for the partially operable cylinder side catalyst, a full operating cylinder side seal mat temperature estimating section for estimating a temperature of a seal mat for the full operating cylinder side catalyst, a fuel amount increase authorization determining section for determining whether to authorize or prohibit an increase in fuel amount based on a partially operable cylinder side seal mat temperature estimated by the partially operable cylinder side seal mat temperature estimating section and a full operating cylinder side seal mat temperature estimated by the full operating cylinder side seal mat temperature estimating section.

In a catalytic converter, the catalyst is protected and held by the seal mat, and the catalyst made of ceramics itself has the heat-resistant critical temperature and the seal mat itself has its own heat-resistant critical temperature. While the temperature of the seal mat rises slower than that of the catalyst, the heat-resistant critical temperature of the seal mat is lower than that of the catalyst.

Consequently, since there is a risk where the seal mat reaches the heat-resistant critical temperature thereof before the full operating cylinder side catalyst temperature reaches, whereupon the cut-off of the cylinder is released, the seal mat temperature is estimated, and whether to authorize or prohibit the increase in fuel amount is determined based on the seal mat temperature so estimated, whereby unburned gas can lower the temperature of exhaust gas by virtue of the increase in fuel amount, and the temperature of the seal mat can be lowered before the heat-resistant critical temperature is reached.

According to a fifth aspect of the invention, there is provided a controller for cylinder cut-off for a multi-cylinder internal combustion engine as set forth in the fourth aspect of the invention, wherein the fuel amount increase authorization determining section determines an increase in fuel amount when at least one of the partially operable cylinder side seal mat temperature and the full operating cylinder side seal mat temperature becomes equal to or higher than a predetermined temperature.

By determining an increase in fuel amount when at least one of the partially operable cylinder side seal mat temperature and the full operating cylinder side seal mat temperature becomes equal to or higher than a predetermined temperature, the fuel is increased in amount and the seal mat is protected against heat.

DETAILED DESCRIPTION OF THE PREFERRED EMBODIMENTS

An embodiment according to the invention will be described based on FIGS. 1 to 7.

Figure 1:
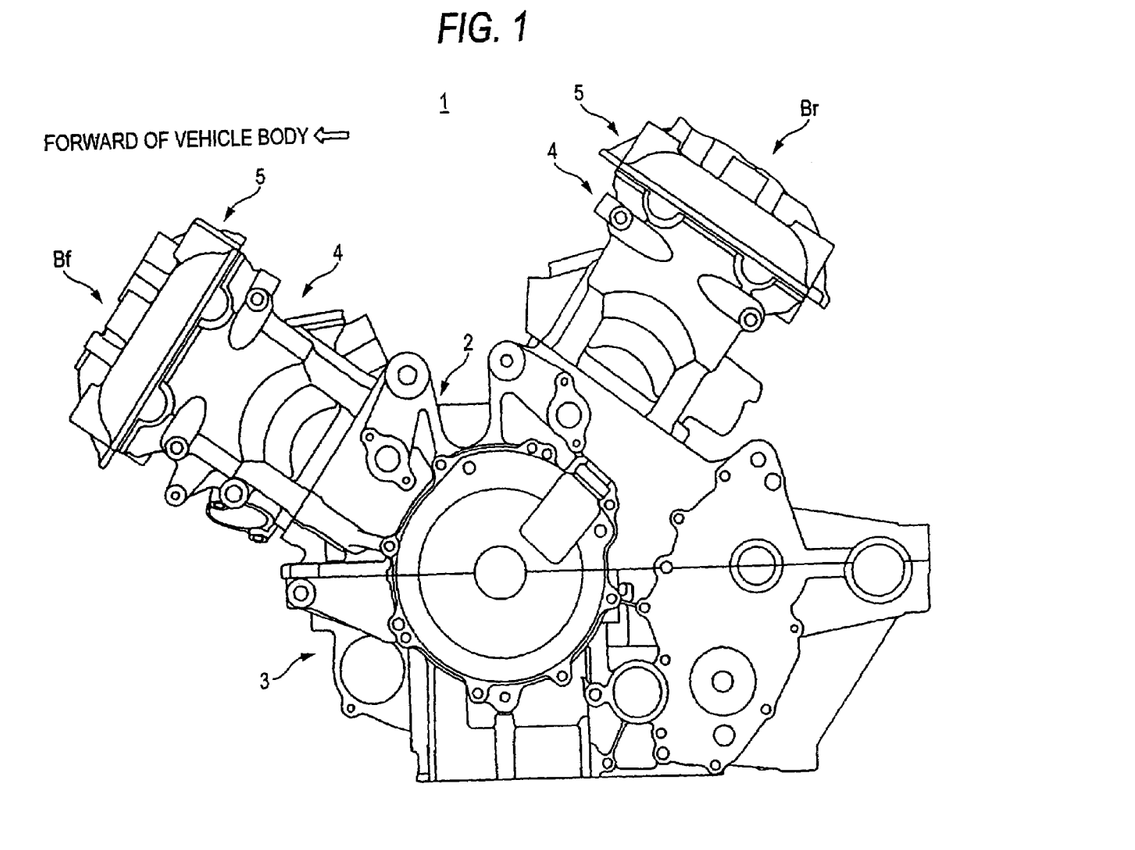
FIG. 1 is a side view of a multi-cylinder internal combustion engine according to an embodiment of the invention.

An OHC four-stroke cycle internal combustion engine 1 installed in a motorcycle, not shown, is, as shown in FIG. 1, a transversely installed vee six-cylinder internal combustion engine in which a front-facing cylinder row of three cylinders (a front bank Bf) and a rear-facing cylinder row of three cylinders (a rear bank Br) are arranged to form an included angle of about 60° in the longitudinal direction.

A main body of the OHC four-stroke cycle internal combustion engine 1 that is arranged as described above includes a cylinder block 2, a crankcase 3 attached integrally to a lower side of the cylinder block 2, cylinder heads 4, 4 which are mounted integrally on top ends of the front-facing cylinder row and the rear-facing cylinder row of the cylinder block 2, respectively, head covers 5, 5 which covers top portions of the cylinder heads 4, 4, respectively.

Figure 2:
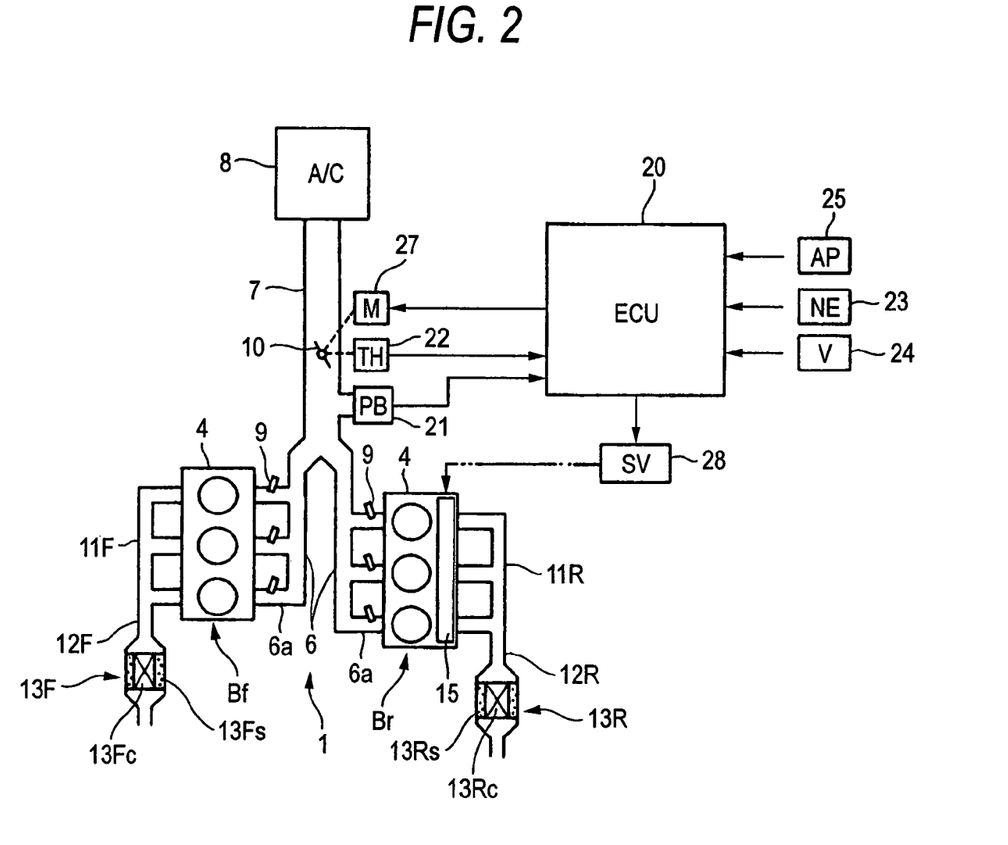
FIG. 2 is an exemplary schematic diagram showing the configuration of a cylinder head of the internal combustion engine with a control system being added thereto.

FIG. 2 is an exemplary schematic diagram showing the configuration of the transversely installed V-type internal combustion chamber 1 with a control system being added thereto.

Induction manifolds 6, 6 are arranged for the front and rear banks Bf, Br of the internal combustion engine 1 within a space formed between the respective banks, and branch pipes 6a of the respective induction manifolds 6, 6 are connected to induction ports of the respective cylinder heads 4.

The respective induction manifolds 6, 6 are collected to connect to an air cleaner 8 via an induction passageway 7.

Fuel injection valves 9 are provided in the respective branch pipes 6a of the induction manifold 6 in such a manner as to face towards the induction ports, respectively, and a throttle valve 10 is disposed at an intermediate position along the length of the induction passageway 7.

On the other hand, exhaust manifolds 11F, 11R are disposed on longitudinally outer sides of the cylinder heads 4, 4 of the front and rear banks Bf, Br, respectively, and branch pipes of the respective exhaust manifolds 11F, 11R are connected to exhaust ports of the respective cylinder heads 4.

Catalytic converters 13F, 13R for purifying exhaust gas are provided, respectively, at intermediate positions along the length of exhaust pipes 12F, 12R which extend independently, respectively, from the respective exhaust manifolds 11F, 11R.

In the catalytic converters 13F, 13R, three-way catalysts 13Fc, 13Rc which are both made of ceramics are encompassed by seal mats 13Fs, 13Rs which are formed of ceramic fibers to be protected and held thereby, respectively.

Of the front and rear banks Bf, Br, a cut-off cylinder mechanism 15 is incorporated in a valve train in the rear bank Br, and the cut-off cylinder mechanism 15 is actuated hydraulically so as to cut off the cylinders of the rear bank Br or to release the cut-off of the cylinders.

When the cylinders on the rear bank Br are cut off, a partial cylinder operating state is realized in which only the front bank Bf is put in operation, and when the cut-off of the cylinders on the rear bank Br is released, a whole cylinder operating state is realized in which the whole of the cylinders are put in operation.

Various types of sensors are provided on the transversely installed V-type internal combustion engine 1 for detecting the operating condition of the engine, and detection signals of the respective sensors are inputted into an electronic control unit ECU 20 to be processed for use in variously controlling the operation of the engine.

Arranged along the induction passageway are an induction pressure sensor 21 for detecting an induction absolute pressure PB and a throttle sensor 22 for detecting a valve opening TH of the throttle valve 10.

In addition, an engine rotational speed sensor 23 for detecting an engine rotational speed NE and a vehicle speed sensor 24 for detecting a vehicle speed V are provided, and detection signals from these sensors are inputted into the ECU 20.

Note that the throttle valve 10 is such as to be driven by a throttle valve driving motor 27 which is controlled by the ECU 20, whereby an electronically controlled throttle valve mechanism is constituted.

In the electronically controlled throttle valve mechanism, the ECU 20 observes the operating conditions of the engine based on an accelerator pedal depression amount AP detected when a detection signal is inputted from an accelerator pedal sensor 25 for detecting a depression amount AP of the accelerator pedal and outputs a control signal to the throttle vale driving motor 27 so as to control the throttle valve 10.

An electromagnetic valve 28 for controlling the hydraulic pressure of the cut-off cylinder mechanism 15 when it is actuated for the cut-off and release of the cylinder is also controlled by the ECU 20 based on the operating conditions of the engine.

In order to effectively use and protect the three-way catalysts 13Fc, 13Rc of the catalytic converters 13F, 13R in the control system that is described above, the ECU 20 includes a catalyst temperature estimating section for estimating the temperature of the catalyst and has a cylinder cut-off authorization determining section for determining whether to authorize or prohibit the cut-off of the cylinder.

The three-way catalyst 13Fc of the catalytic converter 13F for the cylinders of the front bank Bf which are not cut off is designated as a full operating cylinder side catalyst 13Fc, whereas the three-way catalyst 13Rc of the catalytic converter 13R for the cylinders of the rear bank Br which are able to cut off is designated as a partially operable cylinder side catalyst 13Rc.

Figure 3:
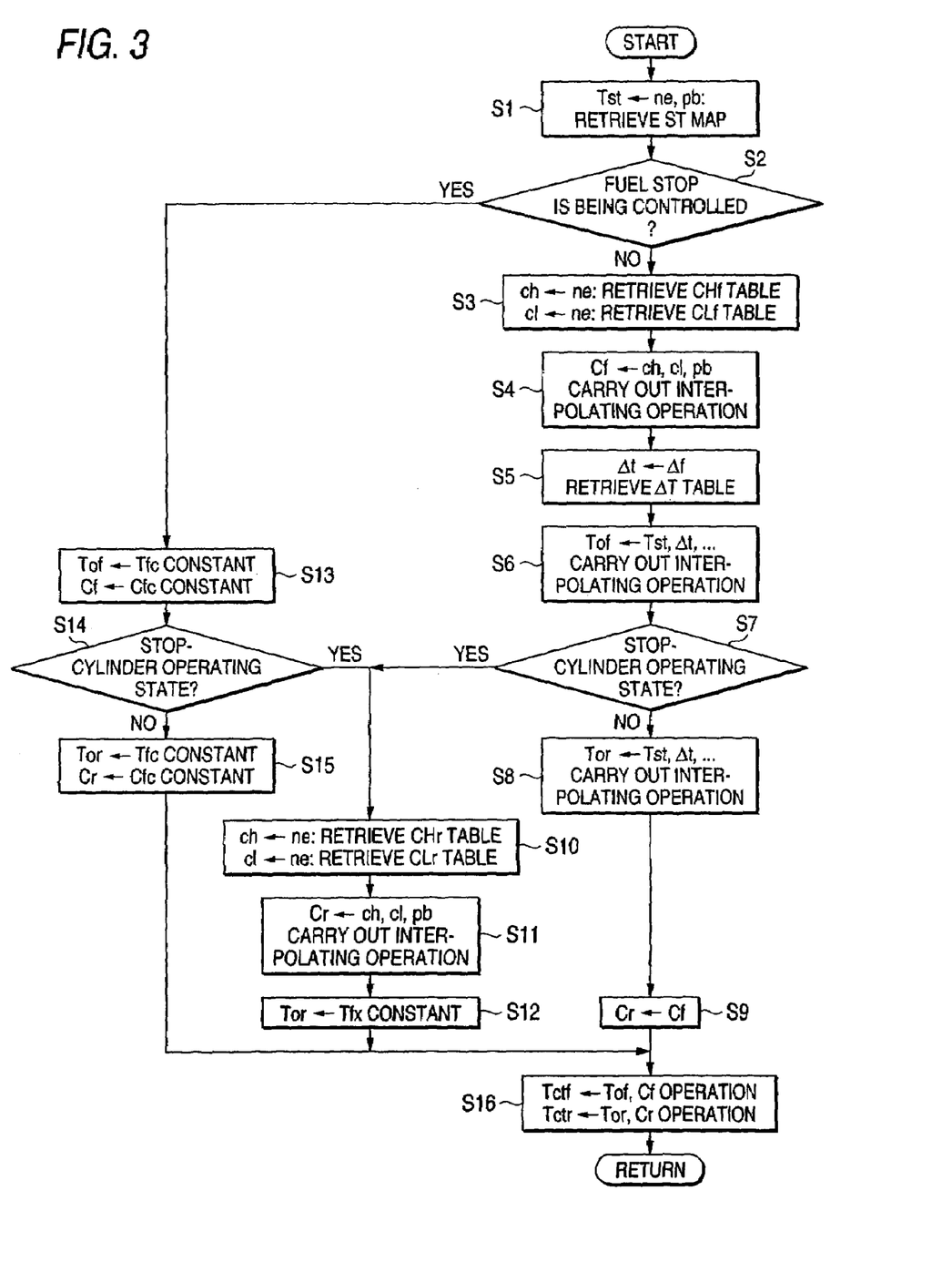
FIG. 3 is a flowchart showing a control procedure for estimation of a catalyst temperature.

An estimating procedure of the catalyst temperature estimating section for separately estimating catalyst temperatures of the full operating cylinder side catalyst 13Fc and the partially operable cylinder side catalyst 13Rc is shown in a flowchart in FIG. 3 for description.

Firstly, in step 1, an ST map is retrieved from a current engine rotational speed ne that is detected by the engine rotational speed sensor 23 and a current induction absolute pressure pb that is detected by the induction pressure sensor 21, so that a standard temperature Ts1 of the catalyst is extracted.

The ST map is such that a standard temperature of the three-way catalyst is obtained from the engine rotational speed NE and the induction absolute pressure PB as parameters so as to be made into a map in advance.

Next, in the following step 2, whether or not a fuel cut-off control is being carried out is determined, and if it is determined that the fuel supply is being cut off, the flow proceeds directly to step 13, whereas if it is determined that the fuel supply is not being cut off, the flow proceeds to step 3.

In step 3, firstly, a target temperature Tof of the full operating cylinder side catalyst. 13Fc and an averaging coefficient Cf are obtained. (Averaging coefficient adds a priority to a numeral value.)

In step 3, a CHf table and a CLf table of the full operating cylinder side catalyst 13Fc are retrieved from the current engine rotational speed ne, and a high-load side coefficient value ch and a low-load side coefficient value cl of the averaging coefficient are obtained.

Figure 4:
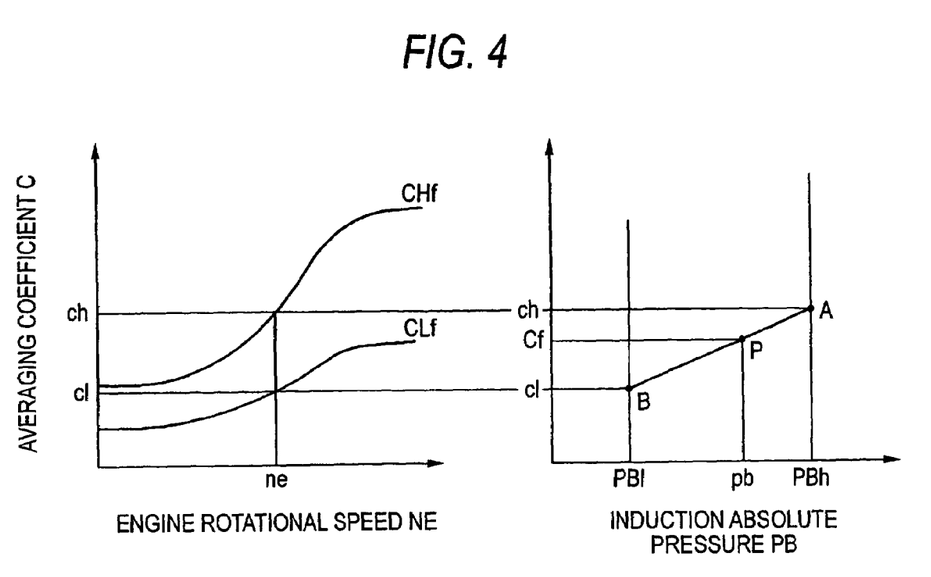
FIG. 4 is a drawing which explains an interpolating operation of an averaging coefficient.

As shown in a left-hand side graph in FIG. 4, the CHf table and CLf table are such as to represent a change in averaging coefficient C, and a change at a time of a predetermined high load is the CHf table, and a change at a time of a predetermined low load is the CLf table.

As shown in the left-hand side graph, a high-load side coefficient value ch and a low-load side coefficient value cl are extracted from the current engine rotational sped ne.

Then, in the following step 4, an averaging coefficient Cf of the full operating cylinder side catalyst 13Fc is obtained from the high-load side coefficient value ch and low-load side coefficient value cl which are so extracted through an interpolation operation by the induction absolute pressure pb.

Referring to a right-hand side graph, a point P where the current induction absolute pressure pb is positioned on a line segment connecting a point A representing the high-load side coefficient value ch on the high-load induction absolute pressure PBh when the CHf table is obtained and a point B representing the low-load side coefficient value cl on the low-load induction absolute pressure PBl when the CLf table is obtained gives the averaging coefficient Cf, and the above interpolation operation is such as to calculate an axis of ordinate o this point P.

In the following step 5, a ΔT table is retrieved from a fuel increase amount coefficient Δf so as to extract a reduction amount Δt of the catalyst temperature.

The ΔT table is a table in which a relationship of the catalyst temperature reduction amount Δt relative to the fuel increase amount Δf is obtained in advance.

Then, in the following step 6, the standard temperature Tst of the catalyst that is already obtained is corrected and calculated from the catalyst temperature reduction amount Δt and other factors such as atmospheric pressure, ignition timing and the existence of EGR to thereby obtain a target temperature Tof of the full operating cylinder side catalyst 13Fc.

Thus, as is described heretofore, in steps: 3 to 6, the target temperature Tof and averaging coefficient Cf of the full operating cylinder side catalyst 13Fc when the fuel is not being cut off are obtained.

Then, the flow proceeding to step 6 to step 7, whether or not a cylinder cut-off (cut-off cylinder) operation is being carried out is determined, and thereafter, a target temperature Tor and averaging coefficient cr of the partially operable cylinder side catalyst 13Rc are obtained.

If it is determined in step 7 that full cylinder operation is being carried out or that all the cylinders are in operation, the flow proceeds to step 8, the standard temperature Tst is corrected and calculated from the catalyst temperature reduction amount At and the other factors such as atmospheric pressure, ignition timing, and the existence of EGR to thereby obtain a target temperature Tor of the partially operable cylinder side catalyst 13Rc.

In the following step 9, the averaging coefficient Cf of the full operating cylinder side catalyst 13Fc is used as an averaging coefficient Cr of the partially operable cylinder side catalyst 13Rc, and the partially operable side and full operating side averaging coefficients take the same value in the whole cylinder operating state.

On the other hand, if it is determined in step 7 that the cut-off cylinder operation is being carried out, the flow proceeds directly to step 10, and in step 10, as with the previous step 3, a CHr table and a CLr table of the partially operable cylinder side catalyst 13Rc are retrieved from the current engine rotational speed ne to thereby obtain a high-load side coefficient value ch and a low-load side coefficient value cl of an averaging coefficient.

Then, in the following step 11, an averaging coefficient Cr of the partially operable cylinder side catalyst 13Rc is obtained from the high-load side coefficient value ch and the low-load side coefficient value cl that are extracted in a similar way to that of the previous step 4 through interpolation operation by the induction absolute pressure pb.

The flow proceeding to step 12, a predetermined constant Tfx is given as the target temperature Tor of the partially operable cylinder side catalyst 13Rc.

When the partially operable side cylinders are being cut off or at rest, the target temperature Tor of the partially operable cylinder side catalyst 13Rc becomes a constant value.

Thus, while a case where the fuel supply is not cut off is described above, when a fuel supply stop control is being performed, the flow proceeds from step 2 directly to step 13, and the target temperature Tof and averaging coefficient of the full operating cylinder side catalyst 13Fc take constant values, and a constant Tfc and a constant Cfc are given.

Then, in step 14, whether or not a partially cylinder operation is being performed is determined, and when a partially cylinder operation is being performed, the flow moves to the previous step 10 to obtain a target temperature Tor and an averaging coefficient Cr, whereas if the whole cylinders are determined to be operating, then the flow proceeds directly to step 15, where as in the case with the full operating cylinder side catalyst 13Fc, a constant Tfc and a constant Cfc are given.

Thus, as is described heretofore, when the target temperature Tof and averaging coefficient Cf of the full operating cylinder side catalyst 13Fc and the target temperature Tor and averaging coefficient Cr of the partially operable cylinder side catalyst 13Rc in the state where the partial cylinder operation is being performed or in the state where the whole-cylinder operation is being performed are obtained, then the flow proceeds to step 16, where an estimated full operating cylinder side catalyst temperature Tctf and an estimated partially operable cylinder side catalyst temperature Tctr are calculated.

They are calculated from the following expressions:

$$Tctf(n)=Tctf(n-1)+[Tof-Tctf(n-1)]\cdot Cf$$

$$Tctr(n)=Tctr(n-1)+[Tor-Tcrf(n-1)]\cdot Cr$$

Tctf(n) and Tctr(n) are a current value of an estimated full operating cylinder side catalyst temperature Tctf and a current value of an estimated partially operable cylinder side catalyst temperature Tctr, respectively, and Tctf(n-1) and Tcgr(n-1) are the previous values of those temperatures.

The target temperatures Tof, Tor are corrected by the averaging coefficients Cf, Cr so as to follow actual temperatures, and catalyst temperatures are estimated.

Since the averaging coefficients Cf, Cr are obtained by interpolating the value when the load is high and the value when the load is low by the induction absolute pressure pb, the estimated full operating cylinder side catalyst temperature Tctf and the estimated partially operable cylinder side catalyst temperature Tctr that are so calculated are estimated with a considerable accuracy.

A determination on whether to authorize or prohibit the cut-off of the cylinders is made by a cylinder cut off authorization determining section based on the estimated full operating cylinder side catalyst temperature Tctf and the estimated partially operable cylinder side catalyst temperature Tctr that are estimated as is described above.

A lower limit temperature which is a threshold for determining the authorization of the cut-off of the cylinders and which secures activation temperatures of both the full operating cylinder side catalyst 13Fc and the partially operable cylinder side catalyst 13Rc and an upper limit temperature which is set to be lower than the heat-resistant critical temperature of the catalyst so that the temperature of the heated catalyst does not reach the heat-resistant critical temperature thereof, and both the lower and upper limit values each have a predetermined range of hysteresis.

Figure 6:
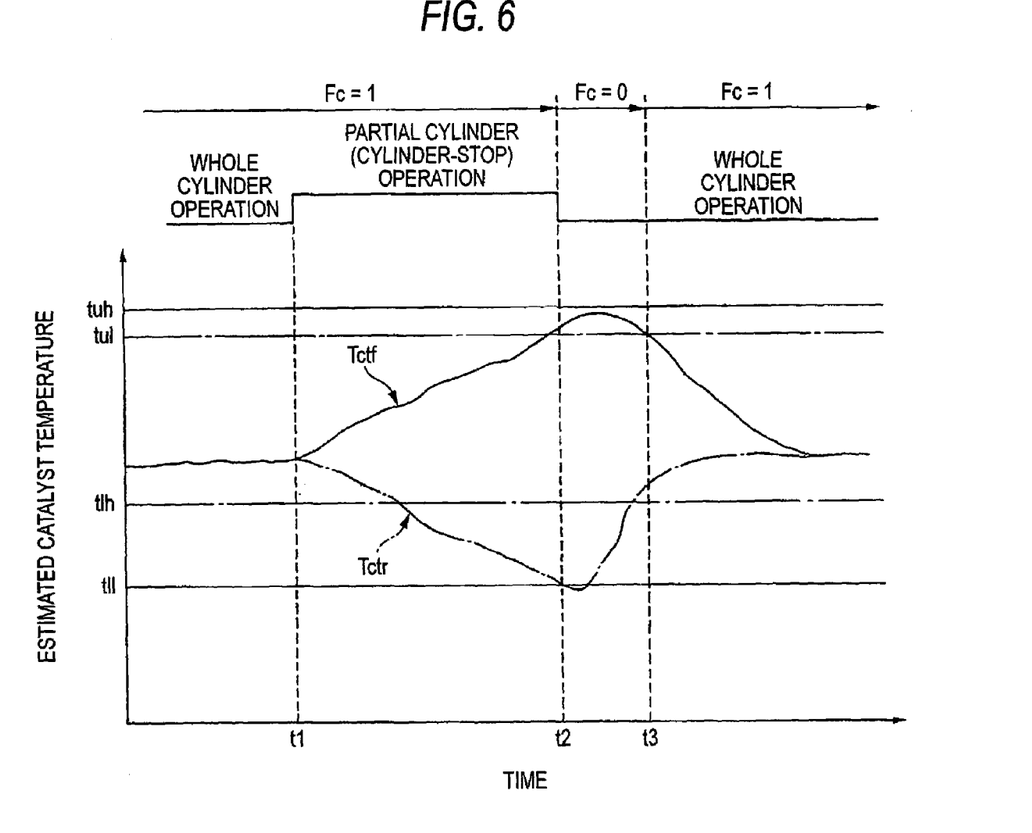
FIG. 6 is a drawing showing an example of determination of a cylinder cut-off authorization by a change in estimated catalyst temperature.

Referring to FIG. 6, the lower limit temperature has a hysteresis characteristic by two thresholds such as a lower limit upper side temperature tlh and a lower limit lower side temperature tll, and the upper limit temperature has a hysteresis characteristic by two thresholds such as an upper limit upper side temperature tuh and an upper limit lower side temperature tul.

These thresholds has a relationship of tll<tlh<tul<Tuh.

Figure 5:
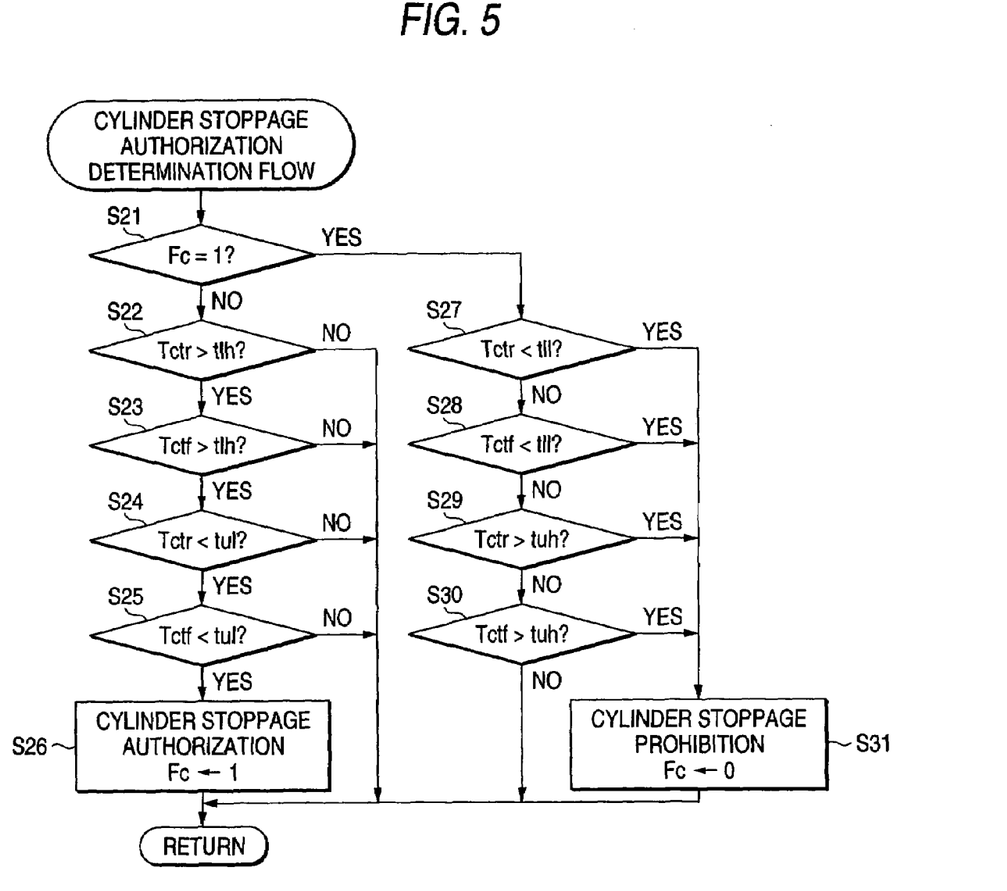
FIG. 5 is a flowchart showing a control procedure for determination of a cylinder cut-off authorization.

A control procedure of the cylinder cut-off authorization determining section for determining an authorization to cut off the cylinders is shown for description in a flowchart shown in FIG. 5.

Firstly, in step 21, whether or not the cut-off of the cylinders is authorized (Fc=1) is determined, and if it is determined that the cut-off of the cylinder is authorized (Fc=1), then the flow proceeds to step 27, whereas if it is determined that the cut-off of the cylinders is prohibited (Fc=0), the flow proceeds to step 22.

When the flow proceeds to step 22 with the cut-off of the cylinders being prohibited (Fc=0), the lower limit upper temperature tlh and the upper limit lower temperature tul are used as the threshold, and when determinations on whether or not the estimated partially operable cylinder side catalyst temperature Tctr and the estimated full operating cylinder side catalyst temperature Tctf are higher than the lower limit upper temperature tlh (steps 22, 23) and determination on whether or not the estimated partially operable cylinder side catalyst temperature Tctr and the estimated full operating cylinder side catalyst temperature Tctf are lower than the upper limit lower temperature tul (steps 24, 25) are answered YES, the determinations are thus made sequentially, and if all the determinations are answered YES, the flow proceeds to step 26, where while "1" is set to a flag Fc to thereby determine an authorization to cut off the cylinders, in the event that there is at least a step among those steps which answers. No, then, the procedure leaves off the flow from that step, the authorization to cut off the cylinders remains as it is.

On the other hand, when the flow proceeds to step 27 with the cut-off of the cylinders being authorized (Fc=1), the lower limit lower temperature tll and the upper limit upper temperature tuh are used as the threshold, and when determinations on whether or not the estimated partially operable cylinder side catalyst temperature Tctr and the estimated full operating cylinder side catalyst temperature Tctf are lower than the lower limit lower temperature tll (steps 27, 28) and determination on whether or not the estimated partially operable cylinder side catalyst temperature Tctr and the estimated full operating cylinder side catalyst temperature Tctf are higher than the upper limit upper temperature tuh (steps 29, 30) are answered NO, the determinations are thus made sequentially, and if all the determinations are answered NO, the procedure leaves off the flow, and whether to authorize the cut-off of the cylinders remains as it is. In the event, however, that there is at least a step among-those steps which answers YES, then, the flow proceeds to step 31, where the flag Fc is then set to be "0", and it is determined that the cut-off of the cylinders is prohibited.

An example of a determination on whether to authorize or prohibit the cut-off of the cylinders will be shown for description in FIG. 6.

Assuming that the cut-off of the cylinders is authorized, and the all the cylinders are in operation with the flag FC=1, the estimated partially operable cylinder side temperature Tctr and the estimated full operating catalyst temperature Tctf are obtained from a route such as from steps 3 to 6, and steps 8 and 9, and they indicate substantially the same temperatures.

The temperature resides between the lower limit lower temperature tll and the upper limit upper temperature tuh, and according to the cylinder cut-off authorization determining flow shown in FIG. 5, steps 27, 28, 29, 10 are just passed.

Then, assuming that there occurs a switch in the operation at a point t1 so that a cylinder cut-off operation is implemented, the estimated full operating cylinder side catalyst temperature Tctr (a solid line in FIG. 6) rises because the full operating cylinders bear the load on the partially operable cylinders side while the estimated partially operable cylinder side catalyst temperature Tctr (a chained line) lowers.

When passing a point t2 where the estimated partially operable cylinder side catalyst temperature Tctr lowers to reach the lower limit lower temperature, since step 27in the cylinder cut-off authorization determining flow in FIG. 5 answers YES, and the flow proceeds to step 31, where the flag Fc is set to "0" to thereby prohibit the cut-off of the cylinders, a whole cylinder operation is then activated and the estimated partially operable cylinder side catalyst temperature Tctr starts to rise, whereas the full operating cylinder side catalyst temperature Tctf starts to lower due to the load starting to lower.

Consequently, since the lowering of the temperature of the partially operable cylinder side catalyst 13Rc below the activation temperature of the catalyst can be avoided to thereby secure the activation temperature, when the partially operable cylinders that are being cut off are released to be activated, the worsening of exhaust emissions can be prevented which would otherwise result from the fact that exhaust emissions would not effectively be purified until the catalyst is heated such that the temperature thereof rises to the activation temperature thereof.

In addition, since the full operating cylinder side catalyst temperature Tctf also starts to lower, there is no case where the full operating cylinder side catalyst 13Fc reaches the heat-resistant critical temperature thereof, whereby the full operating cylinder side catalyst 13Fc is protected.

In addition, in the event that the rise of the estimated full operating cylinder side catalyst temperature Tctf to the upper limit upper temperature tuh results earlier than the lowering estimated partially operable cylinder side catalyst temperature Tctr reaches the lower limit lower temperature Tll, the flow proceeds from step 30 to step 31 in the flowchart shown in FIG. 5 when the earlier point is reached.

In this case, too, the full operating cylinder side catalyst 13Fc is protected against heat, and the activation temperature of the partially operable cylinder side catalyst 13Rc is secured.

The operation is switched to a whole cylinder operation with the cut-off of the cylinders being prohibited (Fc=0), the estimated partially operable side catalyst temperature Tctr rises, whereas the estimated full operating cylinder side catalyst temperature Tctf starts to lower, and according to the example shown in FIG. 6, the flag Fc is set to "1" after passing through the steps. 22, 23, 24, 25 in FIG. 5 to determine the authorization of a cut-off of the cylinders after a point t3 where the rise of the estimated partially operable cylinder side catalyst temperature Tctr exceeds the lower limit upper temperature tlh and thereafter, the lowering estimated full operating cylinder side catalyst temperature Tctf reaches the upper limit lower temperature tul.

The operation is switched such that the cylinder cut-off authorization is granted either at a point in time where the rising estimated partially operable cylinder side catalyst temperature Tctr reaches the lower limit upper temperature tlh or at a point in time where the lowering estimated full operating cylinder side catalyst temperature Tctf reaches the upper limit lower temperature tul, which comes later.

Thereafter, the rise of the partially operable cylinder side catalyst temperature Tctr and the lowering of the full operating cylinder side catalyst temperature Tctf are converged to substantially the same temperature, and thus, the temperatures of the catalysts become stable.

By providing a predetermined range of hysteresis for each of the upper limit temperature and the lower limit temperature, easy repetition of the determination of cylinder cut-off authorization and prohibition can be prevented, thereby making it possible to implement a highly reliable cylinder cut-off control.

In the cylinder cut-off control that is described heretofore, while the determination of a cylinder cut-off authorization is made by estimating the temperatures of the three-way catalysts 13Fc, 13Rc of the catalytic converters 13F, 13R, the seal mats 13Fs, 13Rs for protecting and holding the three-way catalysts 13Fc, 13Rc have also a heat-resistant critical temperature, which is slightly lower than that of the three-way catalysts 13Fc, 13Rc.

The temperature rising rate of the seal mats 13Fs, 13Rs is smaller than the temperature rising rate of the three-way catalysts 13Fc, 13Rc, and the seal mats 13Fs, 13Rs start to rise later than the three-way catalysts 13Fc, 13Rc.

Consequently, in the example shown in FIG. 6, there is a risk that the rise of the full operating cylinder side seal mat 13Fs reaches the heat-resistant critical temperature thereof even after the rise of the full operating cylinder side catalyst temperature Tctf exceeds the upper limit upper temperature tuh so that the operation is switched to the whole cylinder operation, which causes the full operating cylinder side catalyst temperature Tctf to start to lower.

Then, to prevent the occurrence of such a risk, a fuel amount increase control is performed, so that the temperature of exhaust gas is lowered by unburned gas that is produced much by increasing the fuel amount, whereby the catalyst temperature and the seal mat temperature are attempted to be lowered.

Figure 7:
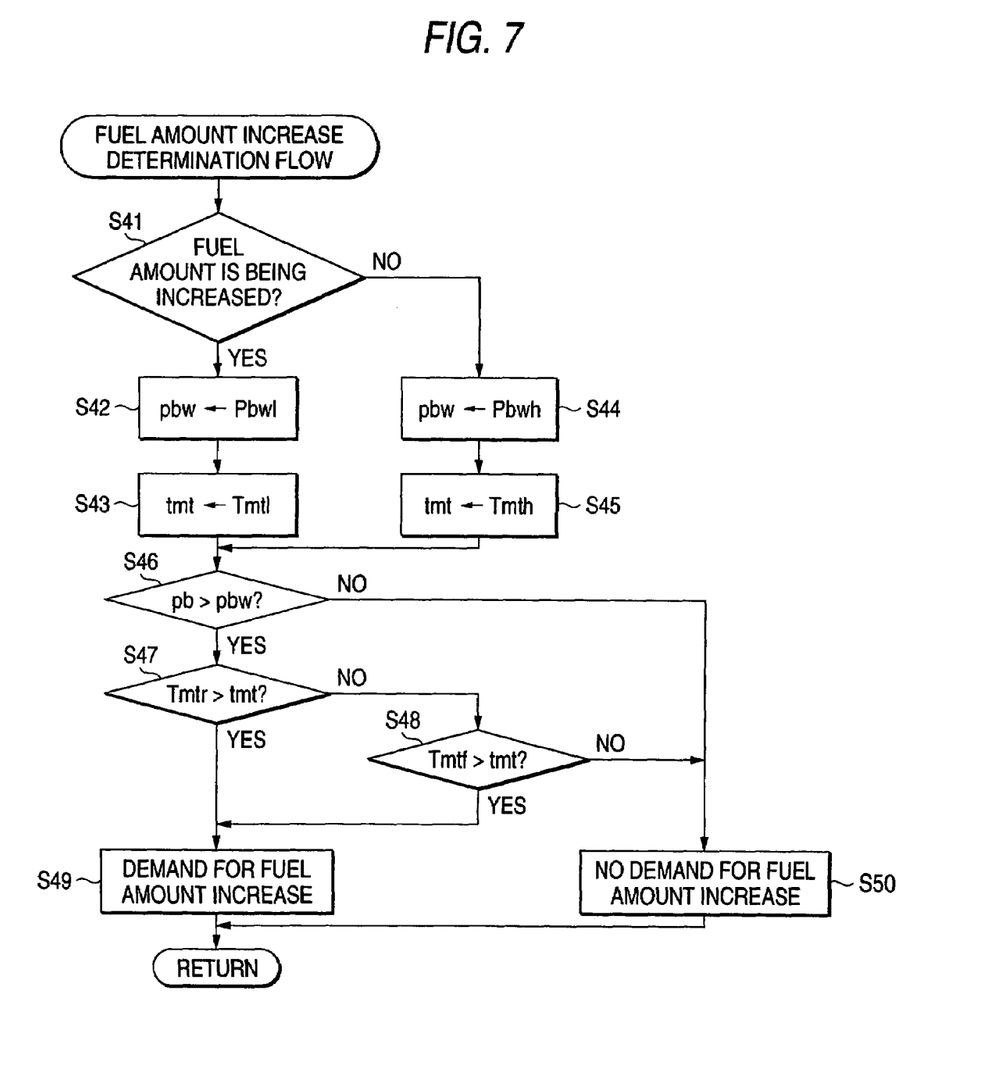
FIG. 7 is a flowchart showing a control procedure for determination of a fuel amount increase.

A determination procedure for determining a fuel amount increase in the fuel amount increase control is shown for description in a flowchart in FIG. 7.

Note that the temperatures of the full operating cylinder side seal mat 13Rs and the partially operable cylinder side seal mat 13Fs are estimated in the same method as the method described by reference to the flowchart shown in FIG. 3 in which the temperatures of the three-way catalysts are estimated.

However, ST map, various tables and constants that are used here are those for the seal mats.

An estimated full operating cylinder side seal mat temperature Tmtf of the full operating cylinder side seal mat 13Fs and an estimated partially operable cylinder side seal mat temperature Tmtr of the partially operable cylinder side seal mat 13Rs are thus obtained.

In the flowchart shown in FIG. 7, firstly, in step 41, whether or not the fuel amount is being increased is determined, and if the fuel amount is determined as being increased, then the flow proceeds to step 42, where enter a predetermined induction absolute pressure value Pbwl in a load threshold pwb, and enter a predetermined temperature Tmtl in the upper limit temperature tmt (step. 43), the flow proceeding to step 46.

In addition, in step 41, if the fuel amount is determined as not being increased, the flow proceeds to step 44, where enter a predetermined induction absolute pressure value Pbwh in the load threshold pbw, and a predetermined temperature tmth in the upper limit temperature tme (step 45), the flow proceeding to step 46.

Here, there being established relationships of Pbwl<Pbwh and Tmtl<Tmth, the load threshold pbw and the upper limit temperature tmt are set higher when the fuel amount is not being increased than when the fuel amount is being increased.

The flow proceeding to step 46, where whether or not the current induction absolute pressure pb detected by the induction sensor 21 is larger than the load threshold pbw is determined, and if the current induction absolute pressure pb is larger than the load threshold pbw and the load is high, then the flow proceeds to step 47, whereas if the current induction absolute pressure pb is smaller than the load threshold pbw, then the flow proceeds directly to step 50, where it is determined that there is no demand for fuel amount increase.

If the current induction absolute pressure pb is larger than the load threshold pbw and the load is high, then the flow proceeding to step 47, whether or not the estimated partially operable cylinder side seal mat temperature Tmtr is larger than the upper limit temperature tmt is determined, and if it is, then the flow proceeds to step 49, where it is determined that there is a demand for fuel amount increase.

If the estimated partially operable cylinder side seal mat temperature Tmtr is smaller than the upper limit temperature tmt, the flow proceeds to step 48, and here, this time, whether or not the estimated full operating cylinder side seal mat temperature Tmtf is larger than the upper limit temperature tmt is determined. If the estimated full operating cylinder side seal mat temperature Tmtf is larger than the upper limit temperature tmt is determined, the flow proceeds to step 49, and it is determined that there is a demand for fuel amount increase, whereas if the seal mat temperature Tmtf is smaller than the upper limit temperature tmt, a fuel amount increase is executed.

Namely, if at least one of the estimated partially operable cylinder side seal mat temperature Tmtr and the estimated full operating cylinder side mat temperature Tmtf is larger than the upper limit temperature tmt, it is determined that there is a demand for fuel amount increase, and then a fuel amount increase is executed.

After all, the temperatures of the seal mats 13Fs, 13Rs are lowered by fuel increased before the heat-resistant critical temperature thereof is reached, and they are protected against heat and are then prevented by being damaged.

The fuel amount increase control and the cylinder cut-off authorization determination control are such as to be implemented independently from each other.

Consequently, there is a case where the fuel amount increase control is performed earlier, whereby the temperatures of the catalysts and seal mats are lowered, and the cylinder cut-off prohibition is put off, whereas there is a case where the fuel amount increase control is implemented after the cylinder cut-off is prohibited.

In either case, the three-way catalysts 13Fc, 13Rc and the seal mats 13Fs, 13Rs are both protected against heat.

In addition, the activation temperature of the three-way catalysts 13Fc, 13Rc, in particular, the activation temperature of the partially operable cylinder side catalyst 13Rc is secured, whereby the production of exhaust emissions is prevented.

What is claimed is:

1. A controller for cylinder cut-off for a multi-cylinder internal combustion engine comprising:
   a partially operable cylinder that is cut off by a cut-off cylinder mechanism provided therewith,
   a full operating cylinder that is always on during operation of the engine,
   partially operable cylinder side catalyst temperature estimating section provided along an exhaust passageway connecting to a partially operable cylinder for estimating a temperature of a catalyst on a partially operable cylinder side,
   full operating cylinder side catalyst temperature estimating section provided along an exhaust passageway connecting to a full operating cylinder for estimating a temperature of a catalyst on a full operating cylinder side, and
   cylinder cut-off authorization determining section for determining whether to authorize or prohibit a cut-off of the partially operable cylinder based on a partially operable cylinder side catalyst temperature estimated by the partially operable cylinder side catalyst temperature estimating section and a full operating cylinder side catalyst temperature estimated by the full operating cylinder side catalyst temperature estimating section.

2. A controller for cylinder cut-off for a multi-cylinder internal combustion engine comprising:
   a partially operable cylinder that can be cut off by a cut-off cylinder mechanism provided therewith,
   a full operating cylinder that is not cut off,
   partially operable cylinder side catalyst temperature estimating section provided along an exhaust passageway connecting to a partially operable cylinder for estimating a temperature of a catalyst on a partially operable cylinder side,
   full operating cylinder side catalyst temperature estimating section provided along an exhaust passageway connecting to a full operating cylinder for estimating a temperature of a catalyst on a full operating cylinder side, and
   cylinder cut-off authorization determining section for determining whether to authorize or prohibit a cut-off of the partially operable cylinder based on a partially operable cylinder side catalyst temperature estimated by the partially operable cylinder side catalyst temperature estimating section and a full operating cylinder side catalyst temperature estimated by the full operating cylinder side catalyst temperature estimating section, wherein the cut-off of the partially operable cylinder is authorized when the full operating cylinder side catalyst temperature is equal to or lower than a predetermined temperature.

3. The controller for cylinder cut-off for a multi-cylinder internal combustion engine as set forth in claim 2, wherein the cut-off of the partially operable cylinder is authorized when the full operating cylinder side catalyst temperature and the partially operable cylinder side catalyst temperature are both equal to or lower than a predetermined high temperature and equal to or greater than a predetermined low temperature.

4. The controller for cylinder cut-off for a multi-cylinder internal combustion engine as set forth in claim 2, wherein the cylinder cut-off authorization determining section determines the prohibition of cut-off of the partially operable cylinder either at a point in time where the partially operable cylinder side catalyst temperature becomes equal to or lower than a predetermined lower limit temperature or a point in time where the full operating cylinder side catalyst temperature becomes equal to or higher than a predetermined upper limit temperature, which comes earlier.

5. The controller for cylinder cut-off for a multi-cylinder internal combustion engine as set forth in claim 4, wherein the lower limit temperature and the upper limit temperature each have a predetermined range of hysteresis.

6. The controller for cylinder cut-off for a multi-cylinder internal combustion engine as set forth in claim 2, further comprising:

partially operable cylinder side seal mat temperature estimating section for estimating a temperature of a seal mat for the partially operable cylinder side catalyst, full operating cylinder side seal mat temperature estimating section for estimating a temperature of a seal mat for the full operating cylinder side catalyst, and fuel amount increase authorization determining section for determining whether to authorize or prohibit an increase in fuel amount based on a partially operable cylinder side seal mat temperature estimated by the partially operable cylinder side seal mat temperature estimating section and a full operating cylinder side seal mat temperature estimated by the full operating cylinder side seal mat temperature estimating section.

7. The controller for cylinder cut-off for a multi-cylinder internal combustion engine as set forth in claim 6, wherein the fuel amount increase authorization determining section-determines an increase in fuel amount when at least one of the partially operable cylinder side seal mat temperature and the full operating cylinder side seal mat temperature becomes equal to or higher than a predetermined temperature.

\* \* \* \* \*